(12) United States Patent
Gilbert

(10) Patent No.: US 11,008,108 B2
(45) Date of Patent: May 18, 2021

(54) TRACK FITTING ADAPTOR

(71) Applicant: Safran Seats USA LLC, Gainesville, TX (US)

(72) Inventor: Klay E. Gilbert, Lindsay, TX (US)

(73) Assignee: Safran Seats USA LLC, Gainesville, TX (US)

( * ) Notice: Subject to any disclaimer, the term of this patent is extended or adjusted under 35 U.S.C. 154(b) by 325 days.

(21) Appl. No.: 16/080,871

(22) PCT Filed: Jun. 23, 2016

(86) PCT No.: PCT/US2016/038860
§ 371 (c)(1),
(2) Date: Aug. 29, 2018

(87) PCT Pub. No.: WO2017/155562
PCT Pub. Date: Sep. 14, 2017

(65) Prior Publication Data
US 2019/0092478 A1    Mar. 28, 2019

Related U.S. Application Data

(60) Provisional application No. 62/306,334, filed on Mar. 10, 2016.

(51) Int. Cl.
*B64D 11/06* (2006.01)
*B64C 1/20* (2006.01)
*B60N 2/90* (2018.01)

(52) U.S. Cl.
CPC ............ *B64D 11/0696* (2013.01); *B64C 1/20* (2013.01); *B60N 2/919* (2018.02)

(58) Field of Classification Search
CPC .............................. B64D 11/0696; B64C 1/20
See application file for complete search history.

(56) References Cited

U.S. PATENT DOCUMENTS

| | | |
|---|---|---|
| 5,178,346 A | 1/1993 | Beroth |
| 7,229,700 B2 * | 6/2007 | Ruggiero ................ C22C 32/00 428/650 |
| 7,410,127 B1 * | 8/2008 | Ahad ................. B64D 11/0696 244/118.5 |
| 7,988,393 B2 * | 8/2011 | Poupon .................... B60N 2/07 410/105 |

(Continued)

OTHER PUBLICATIONS

International Patent Application No. PCT/US2016/038860, Invitation to Pay Additional Search Fee(s) and Partial Search Report, dated Mar. 15, 2017.

(Continued)

*Primary Examiner* — Brian M O'Hara
(74) *Attorney, Agent, or Firm* — Kilpatrick Townsend & Stockton LLP

(57) ABSTRACT

Described are mounting assemblies for securing aircraft passenger seats, including a beam, an adaptor, and fasteners. The beam can include holes spaced along a flat upper surface. The adaptor can be supported by the beam and include a channel, a bottom thickness, and apertures extending through the bottom thickness. The fasteners can extend through the adaptor's apertures and the beam's holes to secure the adaptor to the beam. The adaptor can receive a fitting of a passenger seat in the channel to secure the passenger seat relative to the beam.

16 Claims, 6 Drawing Sheets

(56) References Cited

U.S. PATENT DOCUMENTS

| | | | | |
|---|---|---|---|---|
| 8,182,183 | B2* | 5/2012 | Cook | F16B 37/045 |
| | | | | 410/105 |
| 8,191,829 | B2* | 6/2012 | Erickson | B64C 1/20 |
| | | | | 244/118.5 |
| 8,474,756 | B2* | 7/2013 | Allain | B64D 11/0696 |
| | | | | 244/118.6 |
| 9,896,185 | B2* | 2/2018 | Cullen | B64C 1/20 |
| 9,902,498 | B2* | 2/2018 | Gensch | B60N 2/01575 |
| 2005/0258676 | A1 | 11/2005 | Mitchell et al. | |
| 2006/0292392 | A1 | 12/2006 | Froning et al. | |
| 2010/0116933 | A1 | 5/2010 | Erickson et al. | |
| 2020/0086966 | A1* | 3/2020 | Chadwell | B64C 1/18 |

OTHER PUBLICATIONS

International Patent Application No. PCT/US2016/038860, International Search Report and Written Opinion, dated Jun. 6, 2017.

* cited by examiner

TRACK FITTING ADAPTOR

CROSS REFERENCE TO RELATED APPLICATIONS

This application is related to and claims priority benefits from U.S. Provisional Application Ser. No. 62/306,334, filed on Mar. 10, 2016 entitled 787 TRACK FITTING ADAPTOR, which is hereby incorporated in its entirety by this reference.

FIELD OF THE INVENTION

The field of the invention relates to seat mounting assemblies for passenger vehicles such as aircraft.

BACKGROUND

Many vehicle seats such as those on passenger aircraft, buses, trains, and the like are removably mounted in a track secured to the floor of the vehicle. The tracks typically include a channel along their entire length, where two lips partially enclose the upper side of the channel to form a slot. Semicircular cutout portions are uniformly spaced along the lips to create a series of larger circular openings in the slot. Typically, a track fitting assembly is used to couple the passenger seat to the track, where the track fitting body has studs that extend outwardly from the track fitting body. The studs are typically designed with a flared end attached to a narrower neck. The flared ends of the studs pass through the larger circular openings (e.g., in a vertical direction), and the track fitting assembly is moved along the track (e.g., in a horizontal direction) until the flared ends contact the underside of the slot lips. Bolts or wedge-type elements are commonly used to create a snug fit between the studs and the track lips to prevent seat rattle and unintended seat displacement.

Such channel-type tracks are prevalent in the aircraft industry. Usually, the channel-type tracks are integrally formed into beams or cross members that form the primary structure of an aircraft. Numerous models of seats and other components (such as for galleys, lavatories, partitions, and other fixtures or infrastructure) have been developed that rely on channel-type tracks for adequate securement to the aircraft. In many cases, a significant amount of testing has been performed to establish that components compatible with channel-type tracks provide suitable performance for passing safety regulations imposed by governments or other standard-setting organizations. With resulting widespread use, a significant amount of production capacity and/or inventory tends to be available for components that are compatible with channel-type tracks. Additionally, many technicians have developed a familiarity with channel-type tracks and associated components that allow speed and/or efficiency during recurrent installation, removal, and/or maintenance operations for seats or other components mounted using channel-type tracks aboard aircraft.

Some recent models of aircraft, however, have been produced with a different attachment system for mounting elements within an aircraft cabin. Instead of a beam that features the channel-type track formed in an upper surface of the beam, this different attachment system includes a flat-topped beam. The flat flange forming the top of the beam has a series of through-holes spaced apart at a regular interval, such as 1 inch (2.54 cm) apart. The corresponding seat fittings for such a flat-type attachment system typically include a flat underside and a number of pins that are extendable from the flat underside to pass through the through-holes in the beam. The pins fasten to the bottom of the beam flange, thus clamping the flat underside of the seat fitting to the flat top of the beam.

The differences between the channel-type attachment system and the flat-type attachment system can present a number of challenges. For example, in many cases, it would be cost-prohibitive to individually remove fittings compatible with channel-type attachment and replace them with fittings compatible with flat-type attachment. This may prevent an airline or other organization from utilizing existing inventory (with channel-type fittings) for outfitting aircraft that are set up for the flat-type attachment system. Additionally, there may be additional costs and delays for technicians that are already well-versed with the channel-type attachment to learn how to effectively utilize the components for the flat-type attachment system. Moreover, components for the flat-type attachment system may be relatively more expensive or difficult to obtain, for example, due to lower available production capacity and/or significant costs in producing new tooling to expand production capacity for components for the flat-type attachment system in comparison to components for the channel-type attachment system.

SUMMARY

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the disclosure covered by this patent are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a mounting assembly for securing a passenger seat in an aircraft is provided. The mounting assembly can include a beam, an adaptor, a plurality of fasteners, and a fitting. The beam can include a flat upper surface and a plurality of holes spaced apart from one another along a length of the beam and extending through the flat upper surface. The adaptor can include a channel extending longitudinally along the adaptor. A pair of lips can be partially enclosing an upper side of the channel. A longitudinal slot can be formed between the pair of lips. A plurality of cutouts can be positioned along the pair of lips and define openings in the slot. The adaptor can also include a bottom thickness and a plurality of apertures each extending through the bottom thickness. The plurality of apertures can be arranged along a length of the adaptor so as to directly correspond in location with the plurality of holes of the beam when the adaptor is aligned with the beam. The plurality of fasteners can be configured to extend through the beam and the adaptor via the plurality of apertures and the plurality of holes so as to secure the adaptor to the beam when the adaptor is aligned with the beam. The fitting can include a portion of a passenger seat of an aircraft. The fitting can be configured to be received by the adaptor so as to secure the passenger seat relative to the beam when the adaptor is secured to the beam.

In some embodiments, the adaptor further comprises a corrosion-inhibiting coating so as to prevent a contact between material of the adaptor and material of the beam that could otherwise facilitate galvanic corrosion. In certain embodiments, the beam may include titanium, the adaptor may include aluminum, and the coating of the adaptor inhibits galvanic corrosion between the titanium and the aluminum.

In some embodiments, the mounting assembly further includes receiving structure configured for receiving the plurality of fasteners. In certain embodiments, at least one of the holes of the beam comprises a diameter that is larger than a diameter of at least one of the apertures of the adaptor. The receiving structure may include a bushing configured for receipt in the at least one hole and for receiving a fastener through the at least one of the apertures. In certain embodiments, the receiving structure includes a reinforcing member extending beneath at least a portion of the plurality of the holes in the beam for receiving one or more of the plurality of fasteners. In certain embodiments, the beam may include titanium. A cadmium plating may be included on at least one of a fastener of the plurality of fasteners or some portion of the receiving structure. At least some part of the receiving structure may be disposed so as to prevent a contact between the titanium and the cadmium that could facilitate galvanic corrosion.

According to certain embodiments of the present disclosure, a method is provided. The method can include providing an adaptor. The adaptor may include a channel, a pair of lips, a plurality of cutouts, a bottom thickness, and a plurality of apertures. The channel may extend a length of the adaptor. The pair of lips may be partially enclosing an upper side of the channel. The plurality of cutouts may be positioned along the pair of lips and defining openings into the channel. The plurality of apertures may each extend through the bottom thickness. The method can further include supporting the adaptor on a beam that has a flat upper surface and a plurality of holes spaced apart from one another along a length of the beam and extending through the flat upper surface. The method may can further include aligning apertures of the adaptor with holes of the beam. The method can further include securing the adaptor to the beam. The securing may include at least inserting one or more fasteners through at least some of the apertures and holes that are aligned.

In some embodiments, the method further includes installing a fitting. The fitting may include a portion of a passenger seat of an aircraft. The fitting may be installed into the adaptor so as to secure the passenger seat relative to the beam.

In some embodiments, the method further includes attaching a reinforcement member to the beam by securing the reinforcement member with the one or more fasteners.

In some embodiments, the beam and the adaptor are arranged with a barrier therebetween for preventing direct contact between a metal material of the beam and a different metal material of the adaptor.

In some embodiments, the beam includes titanium, the adaptor includes aluminum, and the adaptor further includes a corrosion-inhibiting coating disposed on the adaptor so as to prevent a contact between the titanium and the aluminum that could otherwise facilitate galvanic corrosion.

In some embodiments, securing the adaptor to the beam includes inserting the fasteners into a receiving structure. The receiving structure may include a bushing, a washer, and a nut. The bushing may be received in a hole in the beam. The washer may be received against the beam and about a fastener extending through the hole. The nut may be received against the washer and about the fastener extending through the hole.

According to certain embodiments of the present disclosure, an adaptor is provided. The adaptor can correspond to a part of a mounting assembly for securing a passenger seat in an aircraft. The adaptor can include a channel, a pair of lips, a slot, a plurality of cutouts, a bottom thickness, a plurality of apertures, and a corrosion-inhibiting coating. The channel can extend along a length of the adaptor. The pair of lips can be partially enclosing an upper side of the channel. The slot can be formed between the pair of lips. The plurality of cutouts can be positioned along the pair of lips and defining openings in the slot. The plurality of apertures can each extend through the bottom thickness. The plurality of apertures can each be spaced apart from one another in an arrangement configured to facilitate alignment with a plurality of holes spaced along a length of a beam. The arrangement further can be configured to facilitate receiving fasteners through the apertures for coupling the adaptor with the beam when the apertures of the adaptor are aligned with the holes of the beam. The corrosion-inhibiting coating can be disposed on the adaptor so as to prevent a contact between aluminum in the adaptor and titanium in the beam that could otherwise facilitate galvanic corrosion.

In some embodiments, the corrosion-inhibiting coating includes a plastic film. In some embodiments, the corrosion-inhibiting coating includes at least one of a zinc-chromate paint or a rust-inhibiting paint.

In some embodiments, the plurality of apertures are arranged in a line spaced apart about 1 inch (2.54 cm) center to center.

In some embodiments, the adaptor may be included in an assembly that includes the beam. The plurality of apertures in the adaptor may be positioned to directly correspond in location with the holes in the beam such that a fastener inserted into a first aperture in the adaptor extends through a first hole in the beam for securement of the adaptor to the beam.

In some embodiments, the adaptor may be included in an assembly that includes the beam, and a reinforcing member. The reinforcing member may be received within the beam, may extend beneath multiple of the holes in the beam, and may receive multiple of the fasteners through multiple of the apertures in the adaptor.

In some embodiments, the adaptor may be included in an assembly that includes the beam, a plurality of fasteners, receiving structure, and a fitting. The plurality of fasteners may extend through the beam and the adaptor via the plurality of apertures and the plurality of holes. The receiving structure may receive the plurality of fasteners so as to secure the plurality of fasteners in an arrangement in which the adaptor is secured to the beam. The fitting may include a portion of a passenger seat of an aircraft. The fitting may be adapted to be received by the adaptor so as to secure the passenger seat relative to the beam.

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the disclosure provide mounting assemblies and associated elements thereof for passenger seats. While the mounting assemblies are discussed for use with aircraft seats, they are by no means so limited. Rather, embodiments of the mounting assemblies may be used in passenger seats or other seats of any type or otherwise as desired. For example, embodiments may be used on trains, buses, movie theaters, student seating, or any other instance when securely anchored seats may be useful.

In various embodiments, the mounting assemblies can include an adaptor that permits seats that are configured for mounting via channel-type tracks to alternatively be mounted relative to beams that are configured for flat-type attachment. The adaptor can include suitable features to permit the adaptor to be mounted to a flat-topped beam and also include suitable features to permit the adaptor to in turn receive flared studs or other elements normally used for engaging channel-type tracks.

The adaptor can include apertures spaced to match a spacing of the through-holes in the beam. Screws or other fasteners can be inserted through the apertures and the through-holes for securing the adaptor and the beam together.

In some embodiments, the apertures may be of a smaller diameter or other size than the through-holes. Bushings or other hardware may be included in the holes in the beam to account for this difference in size and permit the use of screws or other fasteners that are smaller than the pins of flat-type attachment components that are usually used extended through the holes in the flat top of the beam for securement.

The screws or other fasteners may be secured on an opposite side of the beam by any suitable receiving structure, such as washers, nuts, elongate members, or other forms of hardware. In some cases, use of disclosed hardware combinations may facilitate operations for reinforcing the beam in ways that could be hampered or not possible if pins of flat-type attachment components were instead present.

In some embodiments, provision is made for preventing galvanic corrosion between the adaptor and the beam. For example, the adaptor and/or associated components may be coated with a suitable corrosion-inhibiting coating or subject to some other process to reduce a risk of such corrosion.

Figure 1:
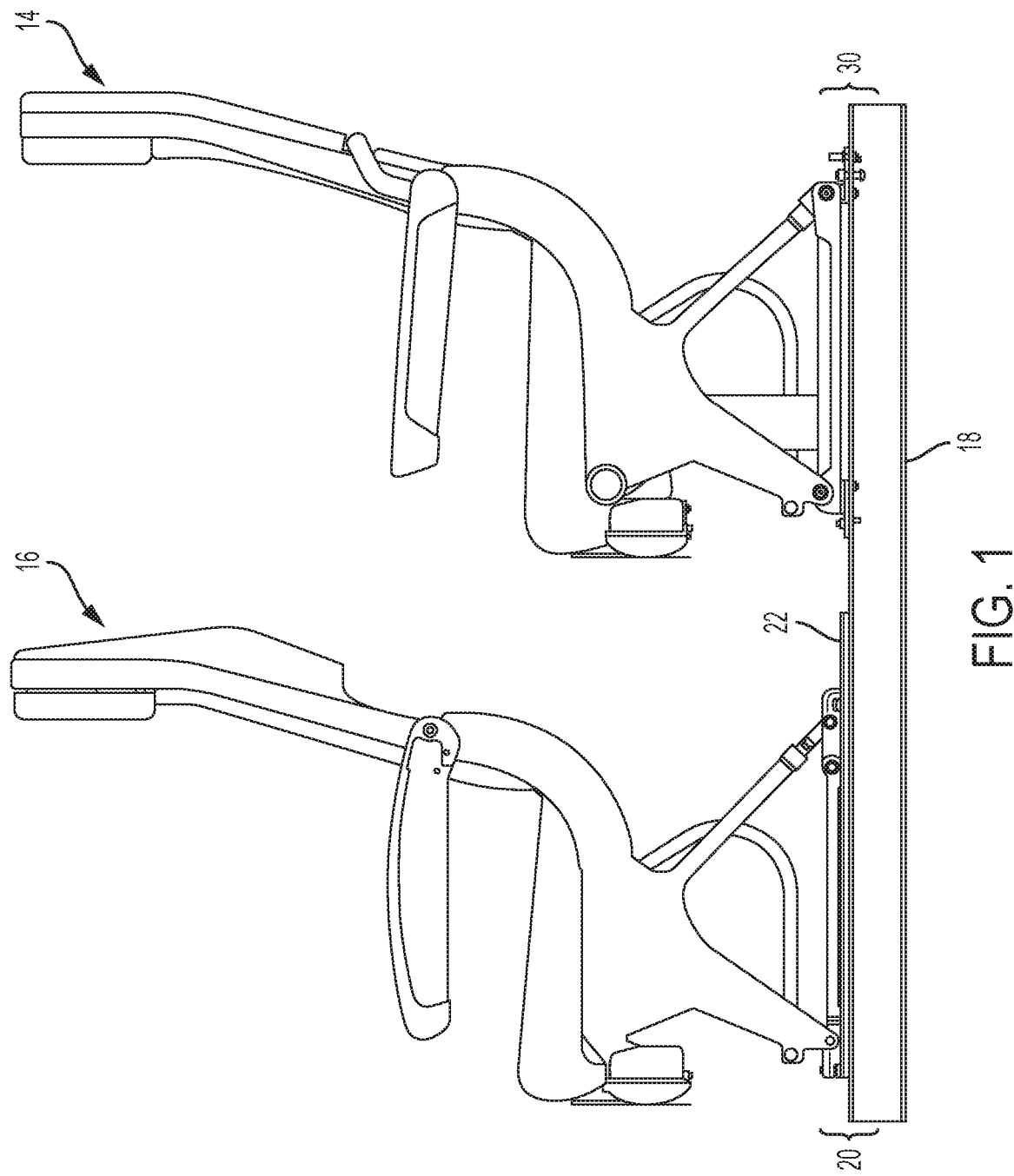
FIG. 1 is a side view of a first and a second passenger seat each mounted to a floor beam of an aircraft, according to certain embodiments of the present disclosure.

According to certain embodiments of the present disclosure, FIG. 1 illustrates a first seat 14 and a second seat 16 each mounted relative to a beam 18. The beam 18 includes features for facilitating flat-type attachment instead of channel-type attachment. The first seat 14 is secured by an attachment assembly 30 that is an example of a flat-type attachment system. The attachment assembly 30 directly attaches the first seat 14 to the beam 18.

In contrast, the second seat 16 is attached to the beam 18 by a mounting assembly 20 that includes an adaptor 22. The adaptor 22 permits the second seat 16 to attach to the beam 18 via channel-type attachment even though the beam 18 is of itself not configured for facilitating channel-type attachment. Although discussion herein primarily focuses on the adaptor 22 facilitating channel-type attachment of a seat to the beam 18, the adaptor 22 may facilitate channel-type attachment to the beam 18 of any component compatible with channel-type attachment, including, but not limited to, seats or other furniture, galley components, lavatory components, partitions, and other fixtures or infrastructure. For example, in many scenarios, the adaptor 22 may permit existing floor cable covers and/or seat shrouds that airlines or other entities have in inventory for use with channel tracks to be used in lieu of more expensive or difficult-to-acquire corresponding components that are designed for installation with the beam 18. Specific features of the beam 18, the mounting assembly 20, and the attachment assembly 30 are shown in FIG. 2.

Figure 2:
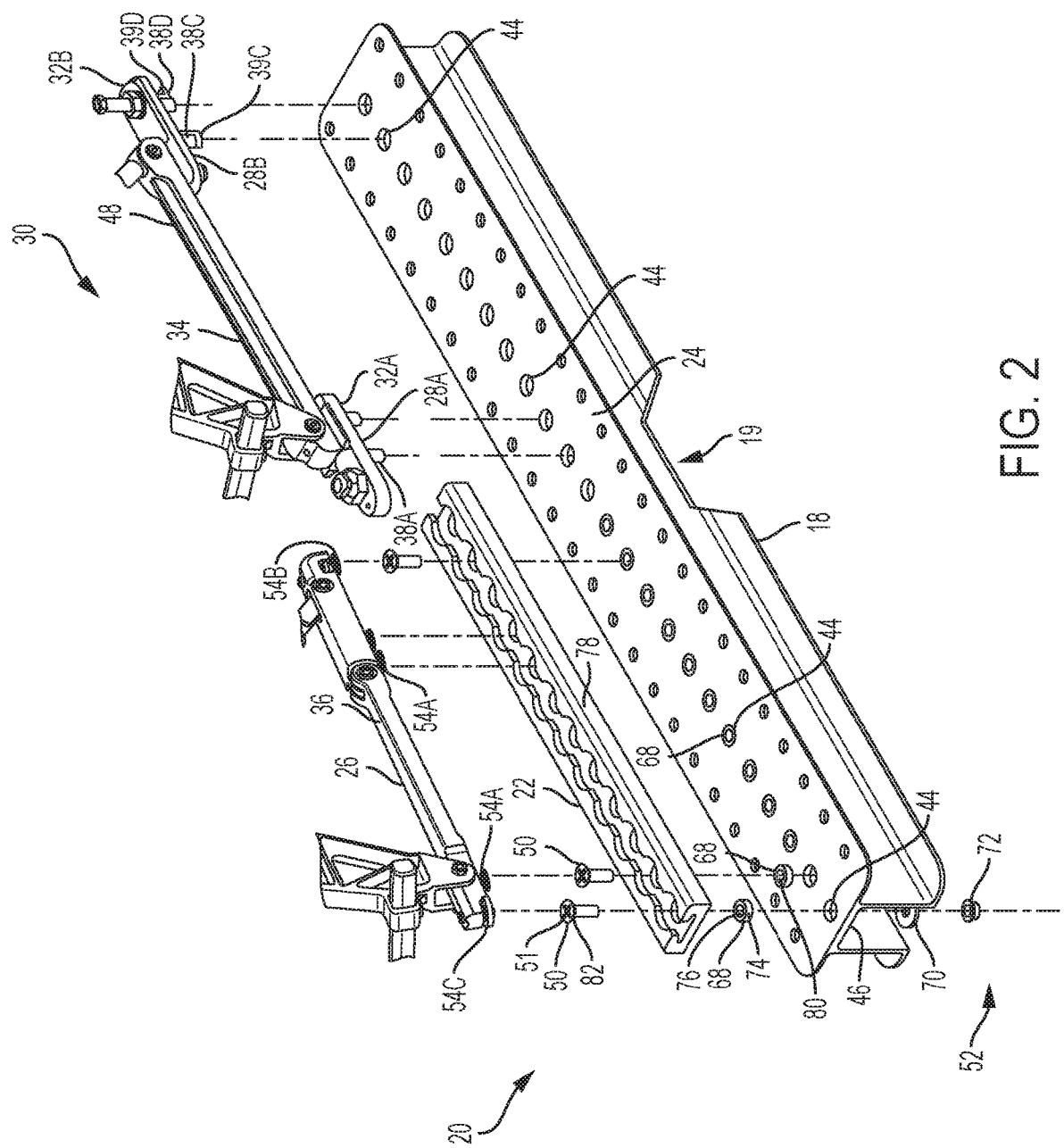
FIG. 2 is an exploded view of mounting assemblies for the passenger seats of FIG. 1.

As shown in FIG. 2, the beam 18 is an elongate member with features that facilitate flat-type attachment. The beam 18 is typically formed of material that includes titanium. However, the beam 18 may additionally or alternatively include materials including but not limited to titanium, aluminum, stainless steel, other metallic materials, composite materials, or other similar materials that provide sufficient strength and stability to support fixtures aboard an aircraft and to withstand forces that may be placed on such fixtures. The illustrated beam 18 is generally I-shaped in cross-section. In some embodiments, the beam 18 may additionally or alternatively be any other suitable shape that provides sufficient stability and strength to support fixtures aboard an aircraft. Examples of suitable cross-sectional shapes include rectilinear, cylindrical, I-shaped, T-shaped, parabolic, oval, or other similar shapes.

The beam 18 includes a top flat surface 24. A series of through-holes 44 extend through the top flat surface 24, for example, penetrating through an underside 46 of the top flat surface 24 of the beam 18. In some embodiments, the top flat surface 24 is approximately 0.180 inches (approximately 0.4572 centimeter) thick, although other thicknesses may be utilized. The through-holes 44 can be spaced apart from one another at a regular interval, such as 1 inch (2.54 centimeters) apart, center to center. In various embodiments, the through-holes 44 are 7/16 inches (0.4375 inches or 1.111 centimeters) in diameter, although other sizes of through-holes 44 may be utilized. In some embodiments, other sizes of through-holes 44 may be used to accommodate different sizes of pins or other hardware. The beam 18 may be oriented so that the series of through-holes 44 is aligned along the longitudinal direction of the aircraft (e.g., from the nose toward the tail). The beam 18 may also include one or more notches 19, which may provide a suitable interface for receiving and fastening to lateral cross-members of the aircraft.

The attachment assembly 30 corresponds to a typical arrangement for facilitating flat-type attachment. The attachment assembly 30 includes a flat-type attachment fitting 34 and the beam 18. The flat-type attachment fitting 34 includes a bar or other structure 48 that corresponds to a bottom portion of the first seat 14. Fastening mechanisms 32 (individually identified as 32A and 32B in FIG. 2) are provided (e.g., extending downward from the bar structure 48) for securing to the beam 18. The undersides of the fastening mechanisms 32 may include respective flat surfaces 28 (individually identified as 28A and 28B in FIG. 2) that may match the top flat surface 24 of the beam 18. The fastening mechanisms 32 include pins 38 (individually identified as 38A, 38B, 38C, and 38D in FIG. 2). The pins 38 are typically approximately 0.405 inches (approximately 1.029 centimeter) in diameter, for example, which allows them to pass through the through-holes 44 in the beam 18 that are of a size of 7/16 inches (0.4375 inches or 1.111 centimeters) in diameter, although other diameters may be used. In use, the pins 38 may be inserted through the through-holes 44 in the beam 18. After such insertion, a section of the pin 38 with a flange 39 (e.g., 39C or 39D in FIG. 2) can be moved to engage the underside 46 of the beam 18. For example, a pin 38 may be at least partially rotated and moved upward to cause a shift from the illustrated orientation of flange 39C to the illustrated orientation of flange 39D to permit engagement with the underside 46 of the beam 18. Engagement of a pin 38 with the underside 46 of the beam may clamp the flat surfaces 28 of the fastening mechanisms 32 against the flat topside of the beam 18 so that the first seat 14 is secured directly to the beam 18.

The mounting assembly 20 may effectively retrofit the beam 18 to permit channel-type attachment. The mounting assembly 20 may be used to retrofit any portion of the beam 18. For example, as shown in FIG. 2, the mounting assembly 20 may be installed on a beam 18 that also includes the attachment assembly 30. The mounting assembly 20 additionally or alternatively may be used as a substitute for the attachment assembly 30 and/or in the absence of the attachment assembly 30.

The mounting assembly 20 shown in FIG. 2 includes a track fitting 26, an adaptor 22, the beam 18, and fasteners 50. Receiving structure 52 may also be included, for example, to receive the fasteners 50 and facilitate securing the fasteners 50 in place. In some embodiments, the fasteners 50 may be capable of securing components together without receiving structure 52 that is separate from the beam 18.

The track fitting 26 includes features that facilitate mounting of the second seat 16 via channel-type attachment. For example, the track fitting 26 may include T-shaped or flared studs 54A, shear pins 54B, anti-rattle discs 54C, or other structure configured to be received into a channel-type track. The track fitting 26 may additionally include a rod or other structure 36 that corresponds to a bottom portion of the second seat 16 or of some other structure to be attached to the beam 18 via the adaptor 22.

The adaptor 22 is shown in various additional views in FIGS. 3-6. The adaptor 22 may be typically formed of material that includes aluminum. However, the adaptor may additionally or alternatively include materials including but not limited to aluminum, other metallic materials, composite materials, or other similar materials that provide sufficient strength and stability to support fixtures aboard an aircraft and to withstand forces that may be placed on such fixtures.

Figure 4:
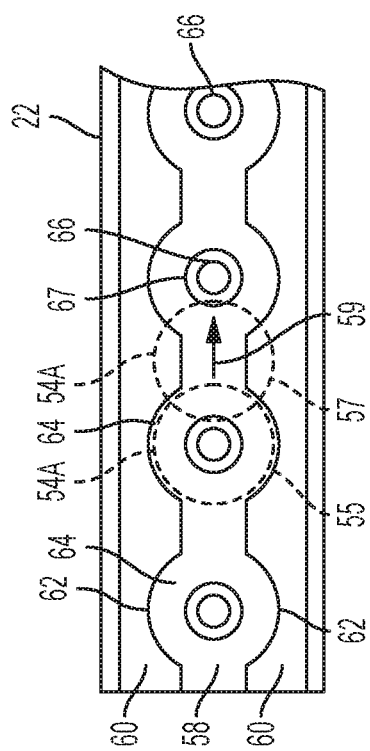
FIG. 4 is a top view of the adaptor of FIG. 3.
Figure 6:
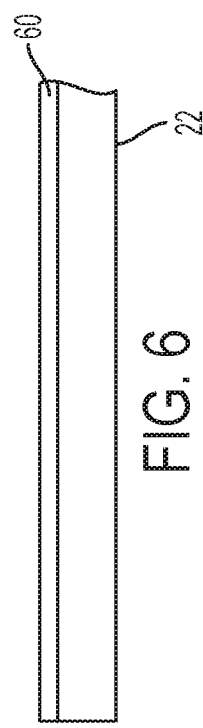
FIG. 6 is a side view of the adaptor of FIGS. 3-5.

The adaptor 22 can include several features that are similar to tracks for channel-type attachment. For example, referring to FIGS. 3-6, the adaptor 22 includes a channel 56, a slot 58, a pair of lips 60, cutout portions 62, and openings 64. The shape and arrangement of features of the adaptor 22 may be determined based on functional and/or aesthetic concerns. In FIGS. 3-6, the channel 56 extends along the length of the adaptor 22. The pair of lips 60 partially enclose an upper side of the channel 56 to form the slot 58. The cutout portions 62 are positioned along the length of the pair of lips 60 to create or define the openings 64. For example, the openings 64 may be formed in the slot 58. The openings 64 may provide access into the channel 56. The cutouts 62 and openings 64 may be rounded, for example, as shown in FIG. 4, they may be respectively semi-circular and circular. The cutout portions 62 and openings 64 may be repeated at a regular spacing along the length of the slot 58. In one example, they are such as spaced 1 inch (2.54 centimeters) apart, center to center. The openings may be approximately 0.780 inches (approximately 1.981 centimeters) in diameter. In one example, this size may correspond to an appropriate size for permitting insertion of the studs 54A, shear pins 54B, or other features of the track fitting 26 into the adaptor 22. However, other sizes may additionally or alternatively be used.

Figure 3:
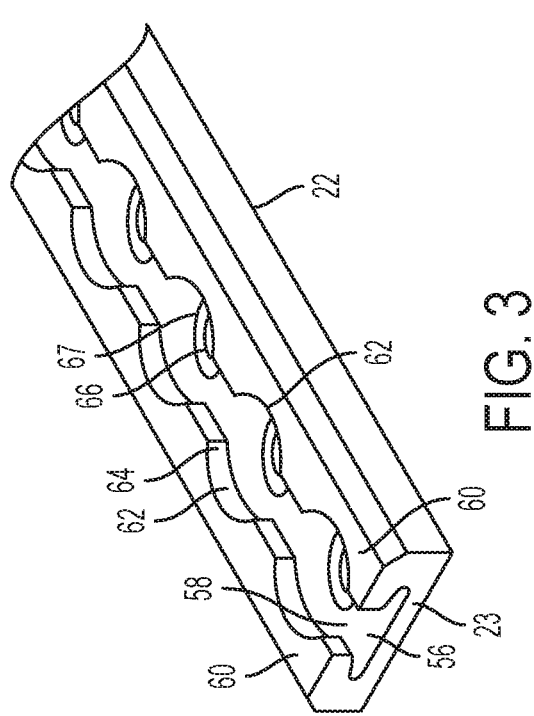
FIG. 3 is a perspective view of an adaptor for one of the mounting assemblies of FIG. 2.

The adaptor 22 also includes apertures 66. The apertures 66 may extend fully through a bottom web or bottom thickness 23 of the adaptor 22 that faces the slot 58. The apertures 66 may have a diameter or other size dimensioned to receive a particular fastener 50. In some embodiments, the apertures 66 may include a countersunk rim 67 for receiving a head 51 of the fastener 50. In one example, a fastener 50 may be a screw having a 1/4 inch (0.25 inch or 0.635 centimeter) bore diameter, although other options are possible. The apertures 66 may be spaced apart at any suitable spacing for aligning with the through-holes 44 in the beam 18. For example, the apertures 66 in FIGS. 3 and 4 are shown spaced every 1 inch (2.54 centimeters), which may permit every through-holes 44 in a section of the beam 18 covered by the adaptor 22 to be aligned with a corresponding aperture 66 in the adaptor. However, in some embodiments, the apertures 66 alternatively may be spaced e.g., every 2 inches (5.08 centimeters), every 3 inches (7.62 centimeters), or at some other whole number multiple of 1 inch (2.54 centimeters) to match up with some subset of the through-holes 44 in the beam 18. In some embodiments, one or more apertures 66 may be omitted along the adaptor 22, e.g., such that certain apertures 66 are skipped in an otherwise regular repeating spacing.

Referring again to FIG. 2, the adaptor 22 can be secured to the beam 18 by engagement of the fasteners 50. In some embodiments, the fasteners 50 may be secured by being received in the receiving structure 52. In some embodiments, the fasteners 50 may be secured without receiving structure 52 that is separate from the beam 18. The fastener 50 can include any suitable interface 82 for driving into securing engagement. For example, the head 51 of the fastener 50 may include a recess that is shaped to accommodate a flat blade screwdriver, x-shaped head screwdriver, a square head screwdriver, a hex key, an Allen Wrench handle, or other similar tool head.

Moreover, any suitable receiving structure 52 can be used. In the embodiment shown in FIG. 2, the receiving structure 52 includes bushings 68, washers 70, and nuts 72. The bushings 68 may be sized to fit and engage the through-holes 44 of the beam 18 along an outer surface 74 of the bushings 68 and receive a fastener 50 or permit passage of a fastener 50 along the inner surface 76 of the bushing 68. The outer surface 74 and/or inner surface 76 of the bushing 68 can include threading or any other suitable surface features to facilitate such functionality. Such features may be provided in any suitable manner, including, but not limited to machining the features into the bushing 68 or coupling the bushing with a locking helical insert or other threaded insert. The bushings 68 may permit fasteners 50 to be used that have a smaller bore diameter than a diameter of the through-holes 44 in the beam 18. This may allow fasteners 50 to be used without increasing a size of the apertures 66 to a point where integrity of the bottom thickness 23 of the adaptor 22 may be affected by the loss of material from forming the apertures 66. However, in some embodiments, the fasteners 50 may be utilized without bushings 68. In one example, the fasteners 50 may include structure that is similar in size and/or function to the pins 38. The fasteners 50 and/or the receiving structure 52 can include any combination of the same or different material. Suitable material may include, but is not limited to metallic materials, composite materials, or other similar materials that provide sufficient strength to withstand forces that may urge separation of the adaptor 22 from the beam 18.

Notwithstanding the wide variety of materials that can be utilized in the mounting assembly 20, in various embodiments, certain combinations of materials that may be used may be subject to a risk of galvanic corrosion if permitted to be in contact with one another. To this end, the adaptor 22 and/or other components of the mounting assembly 20 may include appropriate coating 78 (e.g., FIGS. 2 and 5) to prevent such corrosion. For example, in the absence of such a coating 78, an adaptor 22 with a high aluminum content may be prone to galvanic corrosion if exposed directly to a beam 18 with a high titanium content. Suitable material for such the coating 78 may include zinc-chromate paint, rust-inhibiting paint, a plastic film, or other corrosion-inhibiting coating. The coating 78 may be applied to the adaptor 22 or the beam 18, although in various embodiments, less material and labor may be expended by applying the coating 78 to the adaptor 22 due to the adaptor 22 usually including less surface area than the beam 18.

The choice of materials for the receiving structure 52 may also be made to reduce a risk of corrosion. For example, using fasteners 50 that include stainless steel in conjunction with an adaptor 22 that includes aluminum may pose a corrosion concern since aluminum and stainless steel in contact with each other can corrode if moisture or other liquids are present. Using fasteners 50 formed of an alloy steel (which may be heat treated in some cases) and having a cadmium plating may alleviate this issue of corrosion between the adaptor 22 and the fasteners 50. However, contact between cadmium plating on the fastener 50 and titanium in the beam 18 may pose another risk of corrosion. Using stainless steel (e.g., that has undergone a passivating process) for the bushings 68 may provide a sufficient barrier between the cadmium of the fastener 50 and titanium of the beam 18 to mitigate such corrosion risks. Similarly, if a cadmium plated nut 72 is used to match the material of the fastener 50, a using stainless steel (e.g., that has undergone a passivating process) for the washer 70 may provide a sufficient barrier between the cadmium of the nut 72 and titanium of the beam 18 to mitigate additional corrosion risks.

Figure 5A:
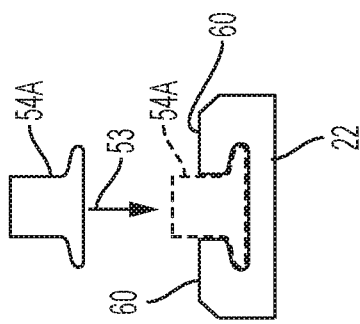
FIG. 5A is an end view of the adaptor of FIG. 5 receiving a portion of a fitting of a passenger seat.
Figure 5:
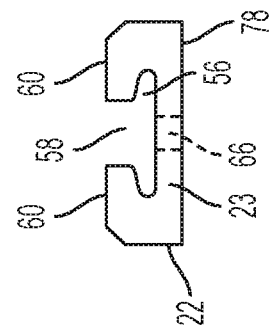
FIG. 5 is an end view of the adaptor of FIGS. 3-4.

An example installation process may be appreciated with reference to FIGS. 2, 4, and 5A. Referring first to FIG. 2, the adaptor 22 can be supported on the beam 18, for example, by bringing the adaptor 22 from the position shown in FIG. 2 into contact with the beam 18. The apertures 66 (FIG. 4) can brought into alignment with the through-holes 44 (FIG. 2). This may entail aligning the apertures 66 (FIG. 4) with the bushings 68 (FIG. 2) or passages 80 through the bushings 68. A respective fastener 50 (FIG. 2) can be inserted through the apertures 66 (FIG. 4), through the passages 80 (FIG. 2) if the bushings 68 are present, and through the bottom of the through-holes 44 in the beam 18. The washer 70 and the nut 72 can be brought into engagement with the fastener 50 to tighten the fastener 50 against the adaptor 22 and secure the adaptor 22 to the top flat surface 24 of the beam 18. With the adaptor 22 secured, the track fitting 26 can be brought into engagement with the adaptor 22. This engagement may be similar to a manner in which the track fitting 26 would be brought into engagement with a channel track. As an illustrative example, a stud 54A (FIG. 2) of the track fitting 26 may be inserted through a opening 64 (FIG. 4) in the adaptor 22. For example, with reference to FIG. 5A, this may correspond to a movement of the stud 54A from the position shown in solid lines to the position shown in phantom lines, as illustrated by the arrow 53. With reference to FIG. 4, such insertion may position the stud 54A within a perimeter of a opening 64, such as at the first position shown by the outline 55. From the inserted position shown by the outline 55, the stud 54A can be translated (e.g., as illustrated by arrow 57) a suitable distance to be brought into engagement with the portions of the lips 60 that are in between the cutout portions 62 (e.g., to the second position shown by the outline 57). Such translation may be achieved by moving the track fitting 26 (FIG. 2) forward or backward along the length of the adaptor 22. In some embodiments, the track fitting 26 may be further secured in place by deploying the shear pins 54B (or other features) for preventing additional forward or backward translation of the track fitting 26 relative to the adaptor 22. In some embodiments, an anti-rattle disc 54C can be vertically translated relative to the track fitting 26 (e.g., by a rotating or screwing motion) to contact a top of the adaptor 22 (e.g., along an upper face of the lips 60, FIG. 5A) and provide an upward displacement of the track fitting 26 (FIG. 2) that presses the stud 54A (FIG. 5A) into engagement with the lips 60 along their interior top surfaces. This may tighten a contact between the stud 54A and the adaptor 22 to reduce an amount of rattle that may otherwise occur. 75

Figures 7, 7A:
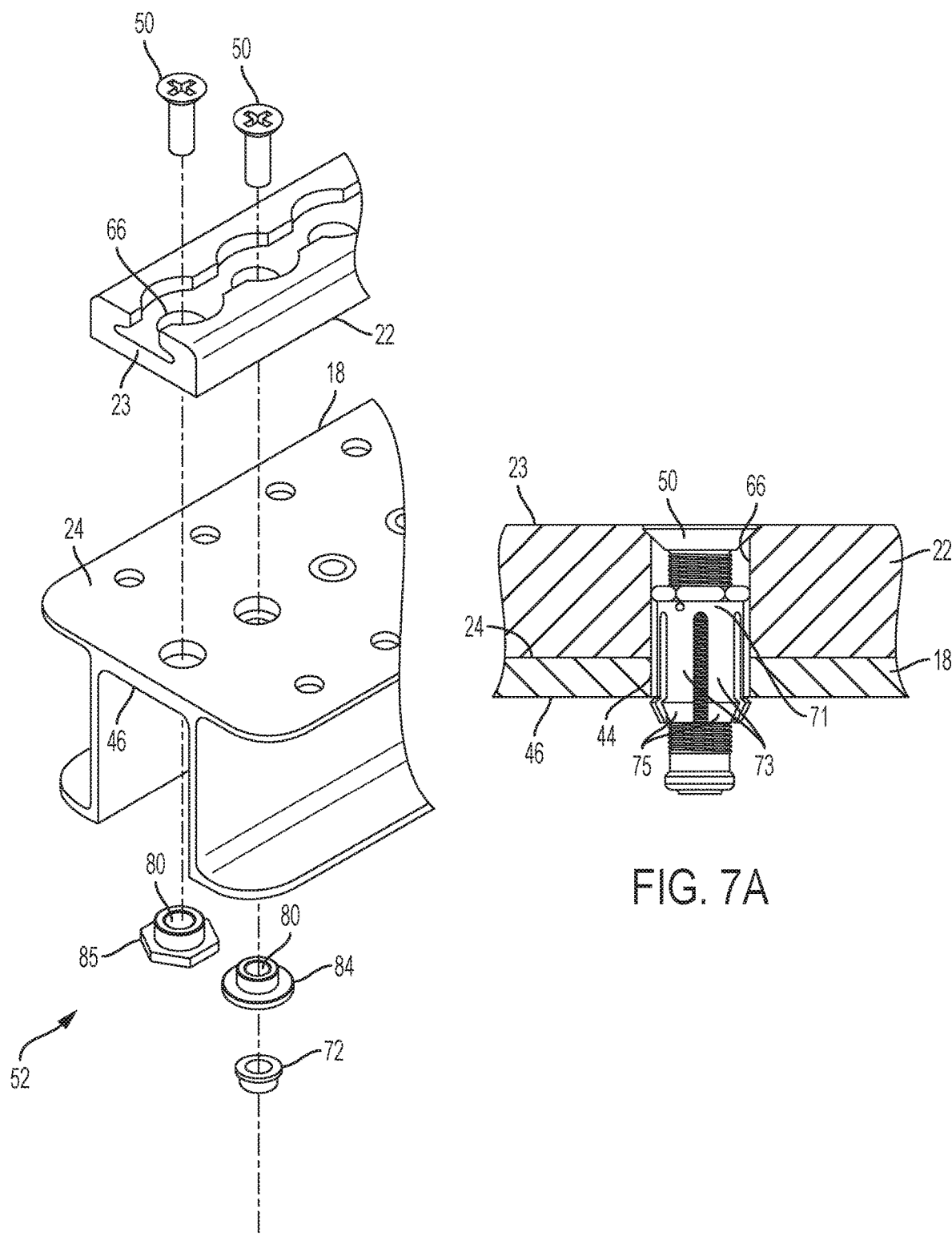
FIG. 7 is an exploded view showing various examples of hardware that may be used to secure the adaptor of FIGS. 3-6.
FIG. 7A is a cutaway side view showing an example of components of a blind fastening system that may be used to secure the adaptor of FIGS. 3-6.

Other forms of receiving structure 52 may be utilized besides the forms shown in FIG. 2. For example, various other options are shown in FIG. 7. A suitable receiving structure 52 may include a hardware component 84 that incorporates the structure of the bushing 68 and the washer 70 shown in FIG. 2 into an integral component. Such a hardware component 84 may be secured with a nut 72 similar to that described with respect to FIG. 2. In some embodiments, the hardware component 84 may be formed of stainless steel (e.g., that has undergone a passivating process) and provide a sufficient barrier for titanium in the beam 18 against cadmium on the fastener 50 and on the nut 72 and to mitigate corrosion risks.

Another alternative for the receiving structure 52 is a hardware piece 85 that combines the structure of the bushing 68, the washer 70, and the nut 72 into a unitary integral piece. In some embodiments, the hardware piece 85 may be formed of stainless steel (e.g., that has undergone a passivating process) and provide a sufficient barrier for titanium in the beam 18 against cadmium on the fastener 50. In various embodiments, combining the structure of some of the receiving structure 52 to be integrally formed into fewer pieces can reduce a difficulty of installation by reducing a number of pieces that may be dropped when trying to couple the pieces together.

In some embodiments, the fasteners 50 may be secured with a receiving structure 52 corresponding to components of a blind fastening system that can be inserted through the top flat surface 24 of the beam 18 for securing without other access to the underside 46 of the beam 18. In one example shown in FIG. 7A, the receiving structure 52 may include a blind insert 71 with flexible fingers 73 that include teeth 75 that extend transverse to the length of the flexible fingers 73. In use, the blind insert 71 may be inserted into a through-hole 44 of the beam 18 from the top flat surface 24 so that the flexible fingers 73 flex inwardly to permit the teeth 75 to fit inside the diameter of the through hole 44. For example, the blind insert 71 may be inserted through an aperture 66 extending through the bottom thickness 23 of the adaptor 22 and be pushed through into the through hole 44 of the beam 18. As the blind insert 71 is moved further into the through-hole 44, the teeth 75 may exit the through-hole 44 on the underside 46 of the beam 18. The flexible fingers 73 may cause the teeth 75 to move radially to a position where the teeth 75 can engage the underside 46 of the beam 18. For example, engaging the fastener 50 in the blind insert 71 may draw the teeth 75 of the blind insert 71 toward the beam 18 to cause such engagement of the teeth 75 with the underside 46 of the beam 18.

Figure 8:
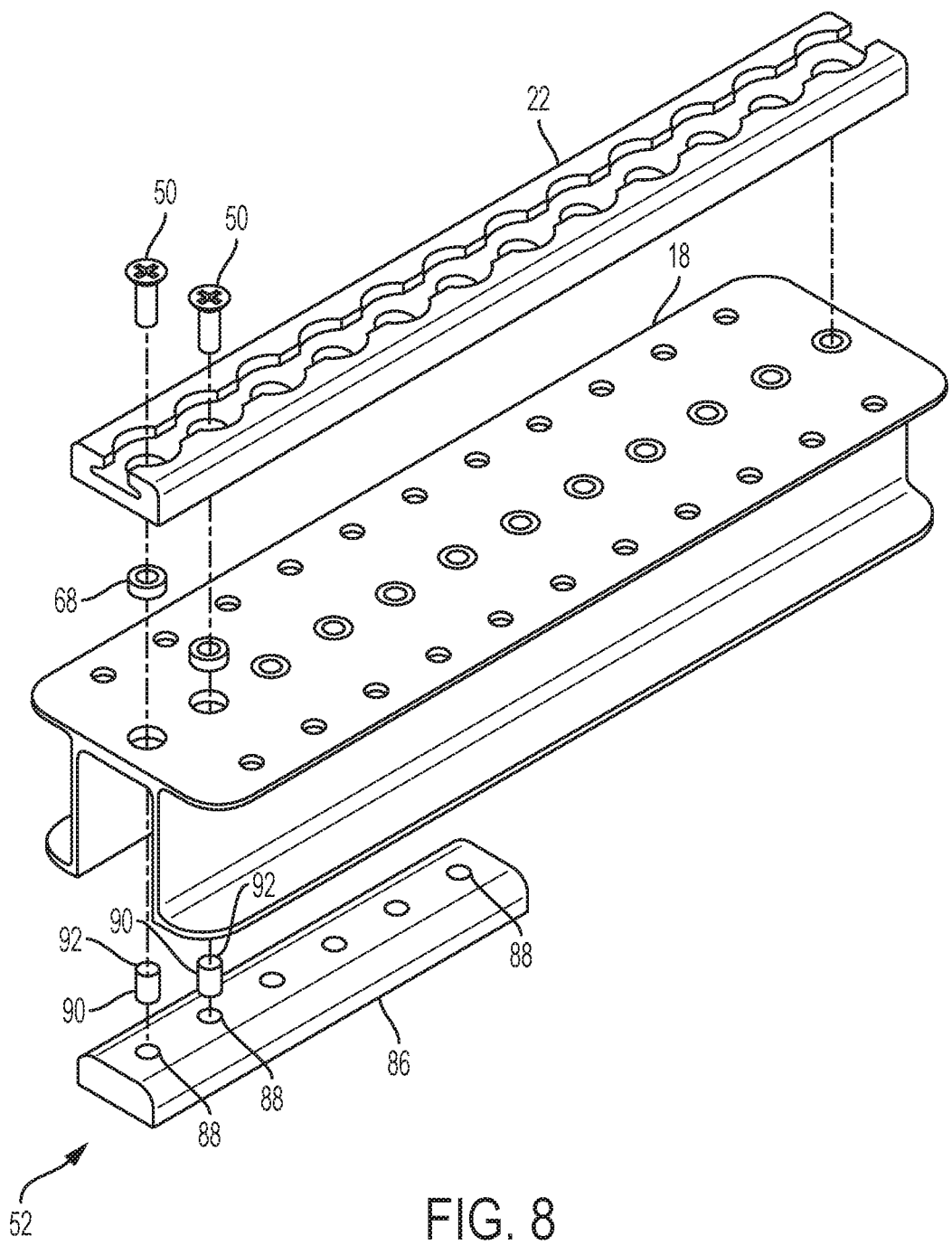
FIG. 8 is an exploded view showing an example of a reinforcing member that may be used to secure the adaptor of FIGS. 3-6.

FIG. 8 illustrates another alternative of a receiving structure 52. The receiving structure 52 may include a reinforcing member 86. The reinforcing member 86 may be positioned to extend beneath at least a portion of the through-holes 44. The reinforcing member 86 may receive one or more of the fasteners 50. For example, as shown in FIG. 8, the reinforcing member 86 includes voids 88 for receiving inserts 90. The inserts 90 may include threaded interior and/or exterior interfaces 92 for engaging the voids 88 in the member 86 and/or engaging the fasteners 50. In some embodiments, providing a reinforcing member 86 that receives multiple of the fasteners 50 may increase an ease of installation, for example, by reducing a number of parts that may be dropped during an installation process.

In one example, the reinforcing member 86 may include titanium. The inserts 90 may include stainless steel (e.g., that has undergone a passivating process) that can provide a sufficient barrier for titanium in the beam 18 and/or in the reinforcing member 86 against contact with cadmium on the fastener 50. Alternatively, providing a reinforcing member 86 that includes stainless steel (e.g., that has undergone a passivating process) may have a similar effect with or without the inserts 90. In a further example, the reinforcing member 86 may be aluminum or some other material and include a barrier (e.g., similar to the coating 78 shown in FIGS. 2 and 5 on the adaptor 22) for preventing galvanic corrosion.

Figure 9:
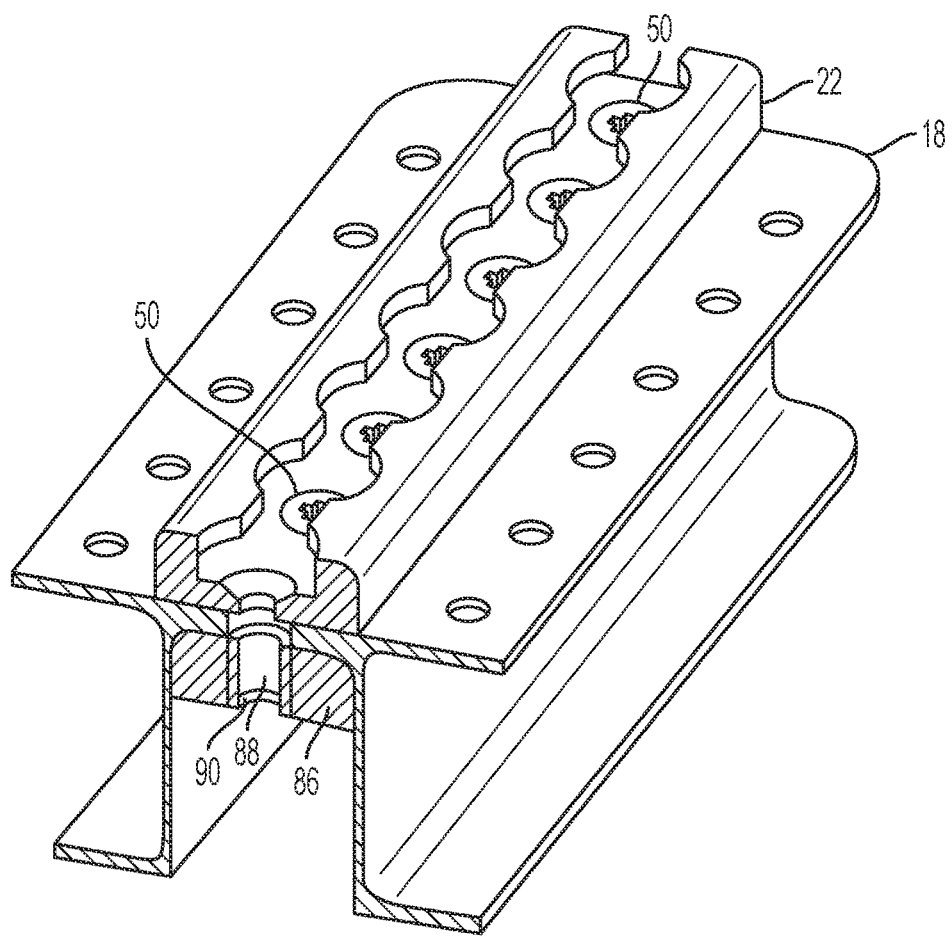
FIG. 9 is an assembled view the elements illustrated in FIG. 8.

FIG. 9 illustrates an assembled version of the components shown in FIG. 8. One advantage of using a reinforcing member 86 for the receiving structure 52 may be that the member 86 may provide a reinforcement of the beam 18. For example, the reinforcement may add sufficient mass to adjust a moment of inertia by a sufficient amount for permitting the beam 18 to support a heavier seat or other structure than the beam 18 might be able to support within certain parameters in the absence of the reinforcing member 86.

Figure 10:
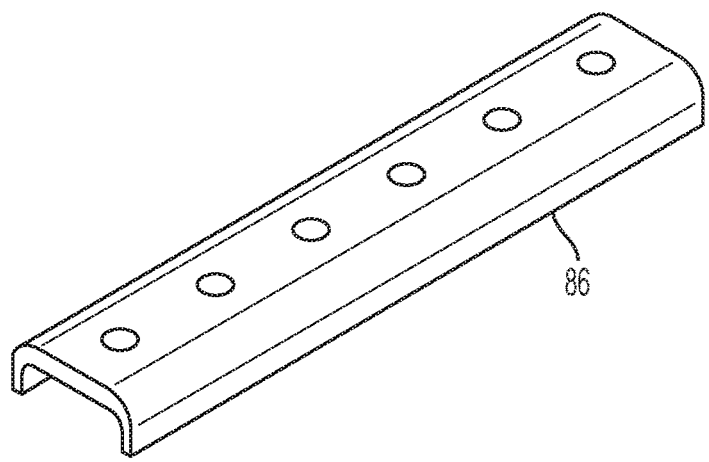
FIG. 10 is perspective view showing another example of a reinforcing member that may be used to secure the adaptor of FIGS. 3-6.

FIG. 10 illustrates an alternative example of a reinforcing member 86, which may include less material than the reinforcing member 86 from FIGS. 8 and 9. Various shapes and/or masses of reinforcing members 86 may be utilized to provide suitable amounts of reinforcement. In some cases, the shape and/or mass of the reinforcing member may be selected so to balance between an amount of reinforcement provided in comparison to an amount of weight added.

In some embodiments, utilizing the adaptor 22 may be advantageous in that it can permit a reinforcing member 86 to be readily included in lieu of other receiving structure 52. For example, a section of the beam 18 that is initially retrofit for a particular seat by using an adaptor 22 that is secured by a fastener 50 received in the washer 70 and the nut 72 of FIG. 2 may later be adapted to secure a heavier seat by replacing the washer 70 and nut 72 with a reinforcing member 86 that will receive the fastener 50 in addition to providing adequate reinforcement for supporting the heavier seat. Such functionality of permitting selection between different receiving structure options may not be readily available in flat-type attachment arrangements (e.g., the attachment assembly 30) because the pins 38 arranged to press against the underside 46 of the beam 18 may interfere with a sliding or other motion to put a reinforcing member 86 in place or may not have sufficient travel to be able to press against an underside of the reinforcing member 86 instead of the underside 46 of the beam 18.

In some aspects, an apparatus is provided according to one or more of the following examples or according to some combination of the elements thereof. In some aspects, features of an apparatus described in one or more of these examples can be utilized to perform a method, or features described in the context of a method may be included in an apparatus.

Example #1

A mounting assembly for securing a passenger seat in an aircraft, the mounting assembly comprising: (I) a beam comprising: (a) a flat upper surface; and (b) a plurality of holes spaced apart from one another along a length of the beam and extending through the flat upper surface; (II) an adaptor comprising: (a) a channel extending longitudinally along the adaptor; (b) a bottom thickness; (c) a pair of lips partially enclosing an upper side of the channel; (d) a longitudinal slot formed between the pair of lips; (e) a plurality of cutouts positioned along the pair of lips and defining openings in the slot; and (f) a plurality of apertures each extending through the bottom thickness, the plurality of apertures arranged along a length of the adaptor so as to directly correspond in location with the plurality of holes of the beam when the adaptor is aligned with the beam; (III) a plurality of fasteners configured to extend through the beam and the adaptor via the plurality of apertures and the plurality of holes so as to secure the adaptor to the beam when the adaptor is aligned with the beam; and (IV) a fitting comprising a portion of a passenger seat of an aircraft, the fitting configured to be received by the adaptor so as to secure the passenger seat relative to the beam when the adaptor is secured to the beam.

Example #2

The mounting assembly of Example #1, or any of the preceding or subsequent examples, wherein the adaptor further comprises a corrosion-inhibiting coating so as to prevent a contact between material of the adaptor and material of the beam that could otherwise facilitate galvanic corrosion.

Example #3

The mounting assembly of Example #2, or any of the preceding or subsequent examples, wherein the beam comprises titanium, wherein the adaptor comprises aluminum, and wherein the coating of the adaptor inhibits galvanic corrosion between the titanium and the aluminum.

Example #4

The mounting assembly of Example #1, or any of the preceding or subsequent examples, further comprising receiving structure configured for receiving the plurality of fasteners.

Example #5

The mounting assembly of Example #4, or any of the preceding or subsequent examples, wherein at least one of the holes comprises a diameter that is larger than a diameter of at least one of the apertures, wherein the receiving structure comprises a bushing configured for receipt in the at least one hole and for receiving a fastener through the at least one of the apertures.

Example #6

The mounting assembly of Example #4, or any of the preceding or subsequent examples, wherein the receiving structure comprises a reinforcing member extending beneath at least a portion of the plurality of the holes in the beam for receiving one or more of the plurality of fasteners.

Example #7

The mounting assembly of Example #4, or any of the preceding or subsequent examples, wherein the beam comprises titanium, wherein a cadmium plating is included on at least one of a fastener of the plurality of fasteners or some portion of the receiving structure, and wherein at least some part of the receiving structure is disposed so as to prevent a contact between the titanium and the cadmium that could facilitate galvanic corrosion.

Example #8

A method comprising: (I) providing an adaptor comprising: (a) a channel extending a length of the adaptor; (b) a pair of lips partially enclosing an upper side of the channel; (c) a plurality of cutouts positioned along the pair of lips and defining openings into the channel; (d) a bottom thickness; and (e) a plurality of apertures each extending through the bottom thickness; (II) supporting the adaptor on a beam that has a flat upper surface and a plurality of holes spaced apart from one another along a length of the beam and extending through the flat upper surface; (III) aligning apertures of the adaptor with holes of the beam; (IV) securing the adaptor to the beam, the securing comprising at least inserting one or more fasteners through at least some of the apertures and holes that are aligned.

Example #9

The method of Example #8, or any of the preceding or subsequent examples, further comprising installing a fitting comprising a portion of a passenger seat of an aircraft into the adaptor so as to secure the passenger seat relative to the beam.

Example #10

The method of Example #8, or any of the preceding or subsequent examples, further comprising attaching a reinforcement member to the beam by securing the reinforcement member with the one or more fasteners.

Example #11

The method of Example #8, or any of the preceding or subsequent examples, wherein the beam and the adaptor are arranged with a barrier therebetween for preventing direct contact between a metal material of the beam and a different metal material of the adaptor.

Example #12

The method of Example #8, or any of the preceding or subsequent examples, wherein the beam comprises titanium, wherein the adaptor comprises aluminum, and wherein the adaptor further comprises a corrosion-inhibiting coating disposed on the adaptor so as to prevent a contact between the titanium and the aluminum that could otherwise facilitate galvanic corrosion.

Example #13

The method of Example #8, or any of the preceding or subsequent examples, wherein securing the adaptor to the beam further comprises inserting the fasteners into a receiving structure comprising a bushing received in a hole in the beam, a washer received against the beam and about a fastener extending through said hole, and a nut received against the washer and about the fastener extending through said hole.

Example #14

An adaptor of a mounting assembly for securing a passenger seat in an aircraft, the adaptor comprising: a channel extending along a length of the adaptor; a pair of lips partially enclosing an upper side of the channel; a slot formed between the pair of lips; a plurality of cutouts positioned along the pair of lips and defining openings in the slot; a bottom thickness; a plurality of apertures each extending through the bottom thickness and spaced apart from one another in an arrangement configured to facilitate alignment with a plurality of holes spaced along a length of a beam, the arrangement further configured to facilitate receiving fasteners through the apertures for coupling the adaptor with the beam when the apertures of the adaptor are aligned with the holes of the beam; and a corrosion-inhibiting coating disposed on the adaptor so as to prevent a contact between aluminum in the adaptor and titanium in the beam that could otherwise facilitate galvanic corrosion.

Example #15

The adaptor of Example #14, or any of the preceding or subsequent examples, wherein the corrosion-inhibiting coating comprises a plastic film.

Example #16

The adaptor of Example #14, or any of the preceding or subsequent examples, wherein the corrosion-inhibiting coating comprises at least one of a zinc-chromate paint or a rust-inhibiting paint.

Example #17

The adaptor of Example #14, or any of the preceding or subsequent examples, wherein the plurality of apertures are arranged in a line spaced apart about 1 inch (2.54 cm) center to center.

Example #18

The adaptor of Example #14, or any of the preceding or subsequent examples, further comprising the beam, wherein the plurality of apertures in the adaptor are positioned to directly correspond in location with the holes in the beam such that a fastener inserted into a first aperture in the adaptor extends through a first hole in the beam for securement of the adaptor to the beam.

Example #19

The adaptor assembly of Example #14, or any of the preceding or subsequent examples, further comprising: the beam; and a reinforcing member received within the beam, extending beneath multiple of the holes in the beam, and receiving multiple of the fasteners through multiple of the apertures in the adaptor.

Example #20

The adaptor of Example #14, or any of the preceding or subsequent examples, further comprising: the beam; a plurality of fasteners extending through the beam and the adaptor via the plurality of apertures and the plurality of holes; receiving structure receiving the plurality of fasteners so as to secure the plurality of fasteners in an arrangement in which the adaptor is secured to the beam; and a fitting comprising a portion of a passenger seat of an aircraft, the fitting adapted to be received by the adaptor so as to secure the passenger seat relative to the beam.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A mounting assembly for securing a passenger seat in an aircraft, the mounting assembly comprising:
   a beam comprising:
      a flat upper surface;
      an underside opposite from the flat upper surface; and
      a plurality of holes spaced apart from one another along a length of the beam and extending through the flat upper surface;
   an adaptor comprising:
      a channel extending longitudinally along the adaptor between a first end and a second end of the adaptor;
      a bottom thickness;
      a pair of lips partially enclosing an upper side of the channel;
      a longitudinal slot formed between the pair of lips;
      a plurality of cutouts positioned along the pair of lips and defining openings in the slot; and
      a plurality of apertures each extending through the bottom thickness, the plurality of apertures arranged within the channel and along a length of the adaptor so as to directly correspond in location with the plurality of holes of the beam when the adaptor is aligned with the beam, and wherein at least one aperture of the plurality of apertures is aligned with at least one cutout of the plurality of cutouts;
   a plurality of fasteners configured to extend through the beam and the adaptor via the plurality of apertures and the plurality of holes so as to secure the adaptor to the beam when the adaptor is aligned with the beam;
   a receiving structure configured for receiving the plurality of fasteners, wherein the receiving structure comprises a reinforcing member on the underside of the beam and extending beneath at least a portion of the plurality of the holes in the beam such that the flat upper surface is between the reinforcement member and the adaptor, wherein at least one fastener of the plurality of fasteners is configured to engage the reinforcement member; and
   a fitting comprising a portion of a passenger seat of an aircraft, the fitting configured to be received by the adaptor so as to secure the passenger seat relative to the beam when the adaptor is secured to the beam.

2. The mounting assembly of claim 1, wherein the adaptor further comprises a corrosion-inhibiting coating so as to prevent a contact between material of the adaptor and material of the beam that could otherwise facilitate galvanic corrosion.

3. The mounting assembly of claim 2, wherein the beam comprises titanium, wherein the adaptor comprises aluminum, and wherein the coating of the adaptor inhibits galvanic corrosion between the titanium and the aluminum.

4. The mounting assembly of claim 1, wherein at least one of the holes comprises a diameter that is larger than a diameter of at least one of the apertures, wherein the receiving structure comprises a bushing configured for receipt in the at least one hole and for receiving a fastener through the at least one of the apertures.

5. The mounting assembly of claim 1, wherein the beam comprises titanium, wherein a cadmium plating is included on at least one of a fastener of the plurality of fasteners or some portion of the receiving structure, and wherein at least some part of the receiving structure is disposed so as to prevent a contact between the titanium and the cadmium that could facilitate galvanic corrosion.

6. A method comprising:
providing an adaptor comprising:
- a channel extending along a length of the adaptor between a first end and a second end of the adaptor;
- a pair of lips partially enclosing an upper side of the channel;
- a plurality of cutouts positioned along the pair of lips and defining openings into the channel;
- a bottom thickness; and
- a plurality of apertures each extending through the bottom thickness, wherein the plurality of apertures are arranged within the channel and along a length of the adaptor, and wherein at least one aperture of the plurality of apertures is aligned with at least one cutout of the plurality of cutouts;

supporting the adaptor on a beam that has a flat upper surface and a plurality of holes spaced apart from one another along a length of the beam and extending through the flat upper surface;
aligning apertures of the adaptor with holes of the beam;
securing the adaptor to the beam, the securing comprising at least inserting one or more fasteners through at least some of the apertures and holes that are aligned; and
attaching a reinforcement member to an underside of the beam opposite from the flat upper surface by securing the reinforcement member with the one or more fasteners.

7. The method of claim 6, further comprising installing a fitting comprising a portion of a passenger seat of an aircraft into the adaptor so as to secure the passenger seat relative to the beam.

8. The method of claim 6, wherein the beam and the adaptor are arranged with a barrier therebetween for preventing direct contact between a metal material of the beam and a different metal material of the adaptor.

9. The method of claim 6, wherein the beam comprises titanium, wherein the adaptor comprises aluminum, and wherein the adaptor further comprises a corrosion-inhibiting coating disposed on the adaptor so as to prevent a contact between the titanium and the aluminum that could otherwise facilitate galvanic corrosion.

10. The method of claim 6, wherein securing the adaptor to the beam further comprises inserting the fasteners into a receiving structure comprising a bushing received in a hole in the beam, a washer received against the beam and about a fastener extending through said hole, and a nut received against the washer and about the fastener extending through said hole.

11. A mounting assembly for securing a passenger seat in an aircraft, the mounting assembly comprising:
- a beam, wherein the beam comprises a flat upper surface and an underside opposite from the flat upper surface;
- an adaptor comprising:
  - a channel extending along a length of the adaptor between a first end and a second end of the adaptor;
  - a pair of lips partially enclosing an upper side of the channel;
  - a slot formed between the pair of lips;
  - a plurality of cutouts positioned along the pair of lips and defining openings in the slot;
  - a bottom thickness;
  - a plurality of apertures each extending through the bottom thickness and spaced apart from one another within the channel and along a length of the adaptor in an arrangement configured to facilitate alignment with a plurality of holes spaced along a length of the beam, the arrangement further configured to facilitate receiving a plurality of fasteners through the plurality of apertures for coupling the adaptor with the beam when the apertures of the adaptor are aligned with the holes of the beam;
- a reinforcing member on the underside of the beam and extending beneath multiple of the holes in the beam such that the flat upper surface is between the reinforcing member and the adaptor and such that at least one fastener of the plurality of fasteners is engageable with the reinforcing member; and
- a corrosion-inhibiting coating disposed on a bottom surface of the adaptor opposite from the upper side of the channel so as to prevent a contact between aluminum in the adaptor and titanium in the beam that could otherwise facilitate galvanic corrosion.

12. The mounting assembly of claim 11, wherein the corrosion-inhibiting coating comprises a plastic film.

13. The mounting assembly of claim 11, wherein the corrosion-inhibiting coating comprises at least one of a zinc-chromate paint or a rust-inhibiting paint.

14. The mounting assembly of claim 11, wherein the plurality of apertures are arranged in a line spaced apart about 1 inch (2.54 cm) center to center.

15. The mounting assembly of claim 11, wherein the plurality of apertures in the adaptor are positioned to directly correspond in location with the holes in the beam such that a fastener inserted into a first aperture in the adaptor extends through a first hole in the beam for securement of the adaptor to the beam.

16. The mounting assembly of claim 11, further comprising:
- a plurality of fasteners extending through the beam and the adaptor via the plurality of apertures and the plurality of holes wherein the reinforcing member receives the plurality of fasteners so as to secure the plurality of fasteners in an arrangement in which the adaptor is secured to the beam; and
- a fitting comprising a portion of a passenger seat of an aircraft, the fitting adapted to be received by the adaptor so as to secure the passenger seat relative to the beam.

* * * * *